US009454565B1

(12) United States Patent
Evans et al.

(10) Patent No.: US 9,454,565 B1
(45) Date of Patent: Sep. 27, 2016

(54) IDENTIFYING RELATIONSHIPS BETWEEN APPLICATIONS

(71) Applicant: Amazon Technologies, Inc., Reno, NV (US)

(72) Inventors: Ethan Zane Evans, Snoqualmie, WA (US); David Allen Markley, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 13/926,215

(22) Filed: Jun. 25, 2013

(51) Int. Cl.
*G06F 17/30* (2006.01)

(52) U.S. Cl.
CPC ................................ *G06F 17/30386* (2013.01)

(58) Field of Classification Search
CPC ............................................... G06F 17/30386
USPC ................................................... 707/758, 736
See application file for complete search history.

(56) References Cited

U.S. PATENT DOCUMENTS

| | | | | |
|---|---|---|---|---|
| 7,318,092 | B2 * | 1/2008 | Sutler .................... | G06Q 30/02 709/223 |
| 7,428,411 | B2 * | 9/2008 | Zellner ......................... | 455/419 |
| 7,467,205 | B1 * | 12/2008 | Dempster et al. ............ | 709/224 |
| 8,051,298 | B1 * | 11/2011 | Burr et al. ..................... | 713/187 |
| 8,244,799 | B1 * | 8/2012 | Salusky et al. ............... | 709/203 |
| 8,380,219 | B1 * | 2/2013 | Wick et al. ................. | 455/456.1 |
| 8,601,010 | B1 * | 12/2013 | Felton et al. ................. | 707/758 |
| 2005/0171961 | A1 * | 8/2005 | Culbreth et al. .............. | 707/100 |
| 2008/0229382 | A1 * | 9/2008 | Vitalos ............................ | 726/1 |
| 2008/0244534 | A1 * | 10/2008 | Golender et al. ............. | 717/128 |
| 2009/0044177 | A1 * | 2/2009 | Bates ......................... | G06F 8/75 717/131 |
| 2009/0089869 | A1 * | 4/2009 | Varghese ........................... | 726/7 |
| 2009/0182864 | A1 * | 7/2009 | Khan et al. .................... | 709/224 |
| 2011/0265077 | A1 * | 10/2011 | Collison et al. .............. | 717/172 |
| 2012/0216244 | A1 * | 8/2012 | Kumar et al. ..................... | 726/1 |
| 2012/0240236 | A1 * | 9/2012 | Wyatt et al. .................... | 726/25 |
| 2013/0046965 | A1 * | 2/2013 | Vin et al. ........................... | 713/1 |
| 2013/0055367 | A1 * | 2/2013 | Kshirsagar et al. .............. | 726/6 |
| 2013/0061054 | A1 * | 3/2013 | Niccolai ........................ | 713/171 |
| 2013/0097659 | A1 * | 4/2013 | Das et al. ......................... | 726/1 |
| 2013/0254880 | A1 * | 9/2013 | Alperovitch et al. .......... | 726/22 |
| 2014/0003358 | A1 * | 1/2014 | Elliott ........................... | 370/329 |
| 2014/0156877 | A1 * | 6/2014 | Tylik et al. ..................... | 710/18 |
| 2014/0245268 | A1 * | 8/2014 | Golender et al. ............. | 717/128 |
| 2014/0280211 | A1 * | 9/2014 | Rash et al. ..................... | 707/748 |

OTHER PUBLICATIONS

Su, X., et al., "Smartphone Dual Defense Protection Framework: Detecting malicious applications in Android Markets", MSN 2012, Chengdu, Sichuan, China, Dec. 14-16, 2012, pp. 153-160.*

Hejazi, S. M., et al., "Extraction of forensically sensitive information from windows physical memory", Digital Investigation, vol. 6, ©2009, Elsevier Ltd., pp. S121-S131.*

(Continued)

*Primary Examiner* — Robert Stevens

(74) *Attorney, Agent, or Firm* — Thomas | Horstemeyer, LLP

(57) ABSTRACT

In various embodiments, static, dynamic, and behavioral analysis may be performed on an application. A set of software libraries or code fragments employed by the application may be determined. A set of device resources employed by the application may be determined. An application fingerprint is generated for the application. The application fingerprint encodes identifiers for the set of software libraries or code fragments and identifiers for the set of device resources.

22 Claims, 5 Drawing Sheets

(56) References Cited

OTHER PUBLICATIONS

Yang, Fang, et al., "Research of Application Protocol Identification System Based DPI and DFI", Recent Advances in CSIE 2011, LNEE 127, Springer-Verlag, Berlin, Germany, Feb. 11, 2012, pp. 305-310.*

Dominica, Steena, et al., "Exemplifying Attack Identification and Analysis in a Novel Forensically Viable Syslog Model", SADFE 2008, Oakland, CA, May 22-28, 2008, pp. 57-68.*

Hyrynsalmi, Sami, et al., "App Store, Marketplace, Play!—An Analysis of Multi-Homing in Mobile Software Ecosystems", IWSECO 2012 Workshop on Software Ecosystems, Cambridge, MA, Jun. 18, 2012, pp. 59-72.*

Chun, Byung-Gon, et al., "CloneCloud: Elastic Execution between Mobile Device and Cloud", EuroSys '11, Salzburg, Austria, Apr. 10-13, 2011, pp. 301-314.*

U.S. Appl. No. 13/926,574, filed Jun. 25, 2013 and entitled "Application Recommendations Based on Application and Lifestyle Fingerprinting", Jul. 3, 2013.

U.S. Appl. No. 13/926,234, filed Jun. 25, 2013 and entitled "Recommending Improvements to and Detecting Defects Within Applications", Jul. 3, 2013.

U.S. Appl. No. 13/926,607, filed Jun. 25, 2013 and entitled "Application Fingerprinting", Jul. 3, 2013.

U.S. Appl. No. 13/926,656, filed Jun. 25, 2013 and entitled "Application Monetization Based on Application and Lifestyle Fingerprinting", Jul. 3, 2013.

U.S. Appl. No. 13/926,683, filed Jun. 25, 2013 and entitled "Developing Versions of Applications Based on Application Fingerprinting", Jul. 3, 2013.

U.S. Appl. No. 13/926,211, filed Jun. 25, 2013 and entitled "Analyzing Security of Applications", Jul. 3, 2013.

U.S. Appl. No. 13/215,972, filed Aug. 23, 2011 and entitled "Collecting Application Usage Metrics", Jul. 3, 2013.

U.S. Appl. No. 13/555,724, filed Jul. 23, 2012 and entitled "Behavior-Based Identity System", Jul. 3, 2013.

* cited by examiner

IDENTIFYING RELATIONSHIPS BETWEEN APPLICATIONS

BACKGROUND

An application marketplace may offer a multitude of different applications, such as mobile applications. For example, the applications may include games, email applications, social networking applications, mapping applications, imaging applications, music playing applications, shopping applications, and so on. Developers may wish to compare the developer's applications against other application that might be related to the developer's applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating profiles of applications, referred to herein as application fingerprinting. An application fingerprint uniquely identifies an application based on, for example, what application programming interfaces (API) it uses, what software libraries or code fragments it uses, what hardware devices it accesses, what device resources it employs, typical resource consumption patterns, and/or other characteristics. In some embodiments, the application fingerprint may also identify typical user behavior relative to the application. The application fingerprints may have many uses, including application search, application categorization, defect detection, and so on. Accordingly, in an application marketplace, the application fingerprint of many applications that are potentially related to one another in some way can be generated. Applications that are offered via a curated application marketplace are often categorized into categories that have a sometimes rough and tenuous relationship with the content of the application. Accordingly, embodiments of the present disclosure can analyze the application fingerprints of applications that are categorized together within an application marketplace and identify applications that are more closely related to one another based upon an analysis of the respective application fingerprints of the applications.

Figure 1:
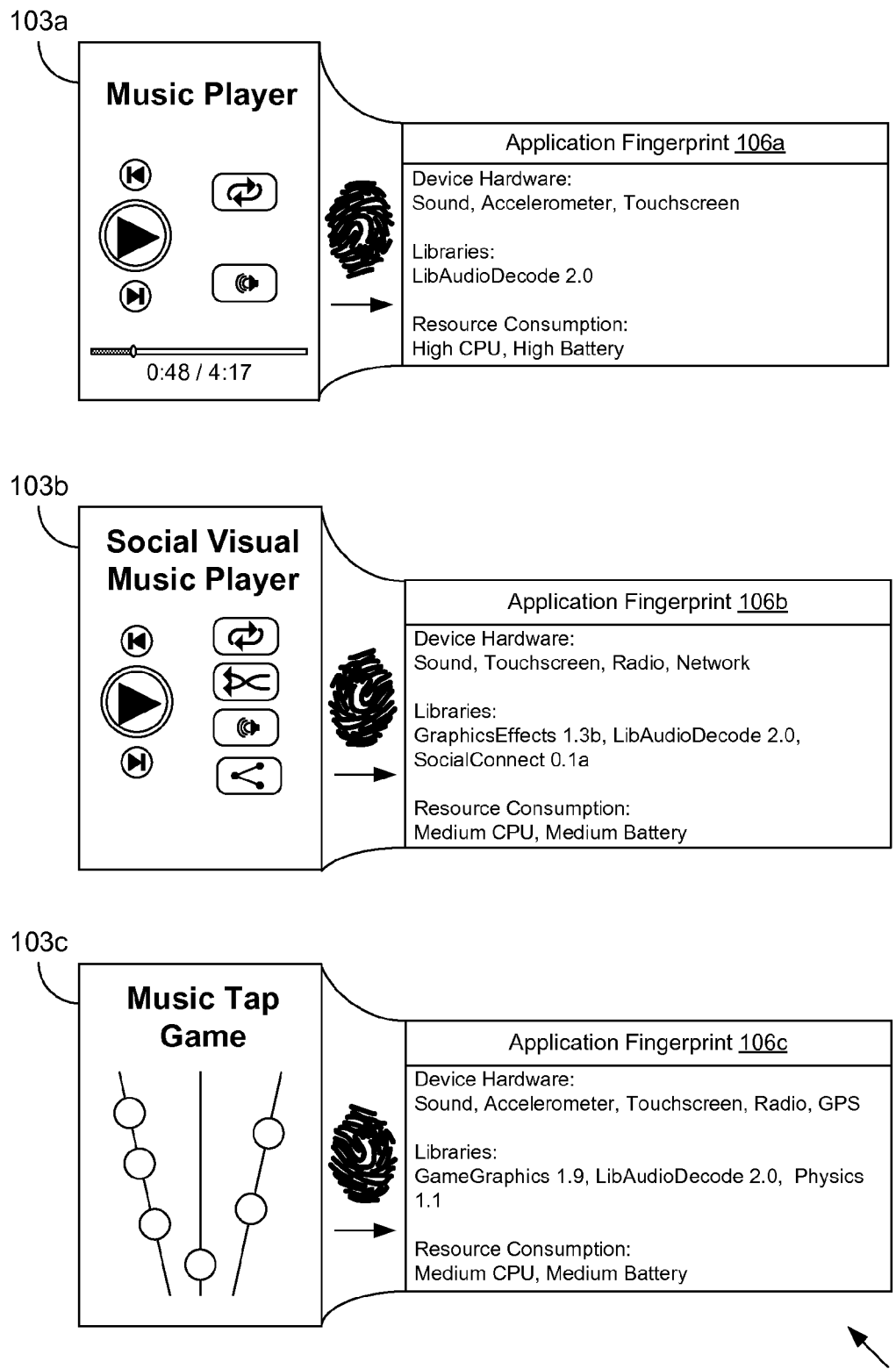
FIG. 1 is a drawing of an exemplary application fingerprint scenario according to various embodiments of the present disclosure.

With reference to FIG. 1, illustrated is an application analyzer 221. More specifically, the application analyzer 221 illustrates three applications 103a, 103b and 103c, for which corresponding application fingerprints 106a, 106b and 106c are generated. The applications 103 are representative of the multitude of applications 103 that may be offered by an application marketplace. In this non-limiting example, the application 103a corresponds to a music player and the application 103b corresponds to another music player that may have varying and/or additional features relative to the application 103a. Application 103c comprises yet another application that may be categorized with the application 103a and 103b within an application marketplace, but that has varying features relative to applications 103a and 103b. Each of the applications 103 has its own respective application fingerprint 106 that can function to distinguish one application 103 from another and/or to identify similarities between applications 103. Accordingly, in the non-limiting example of FIG. 1, each of the application fingerprints 106 identifies characteristics relating to device hardware used, software libraries or code fragments used, and resource consumption. In other examples, additional or different characteristics may be represented by the application fingerprints 106.

Here, the application fingerprint 106a indicates that the application 103a uses the accelerometer and touchscreen of the device and the software libraries named "Graphics Effects 1.3b" and "LibAudioDecode 2.0." Also, the application 103a is associated with high processor and battery usage. The application fingerprint 106b indicates that the application 103b uses a sound device, the touchscreen of the device as well as radio and network capabilities of the device. The application fingerprint 106b also indicates that the application 103b uses the software libraries or recognizable code fragments named "GraphicsEffects 1.3b," and "LibAudioDecode 2.0," and "SocialConnect 0.1a." The application 103b is associated with medium processor and battery usage. The application fingerprint 106c indicates that the application 103c uses different software libraries, including "GameGraphics 1.9," and "Physics 1.1." The application 103c is also associated with medium processor and battery usage.

Accordingly, embodiments of the disclosure can analyze the application fingerprint of a given application in order to identify related applications within a category in an application marketplace. For example, a category in an application marketplace may comprise "games," but such a categorization fails to provide a user and/or developer with enough refinement if either is seeking to locate and/or compare the application with others that are similar. Additionally, embodiments of the disclosure can analyze the application fingerprint of a given application as well as usage data gathered about the application and generate reporting data as well as recommendations with respect to an application's usage with respect to various aspects of the application. In the following discussion, a general description of the system and its components is provided, followed by a discussion of the operation of the same.

Figure 2:
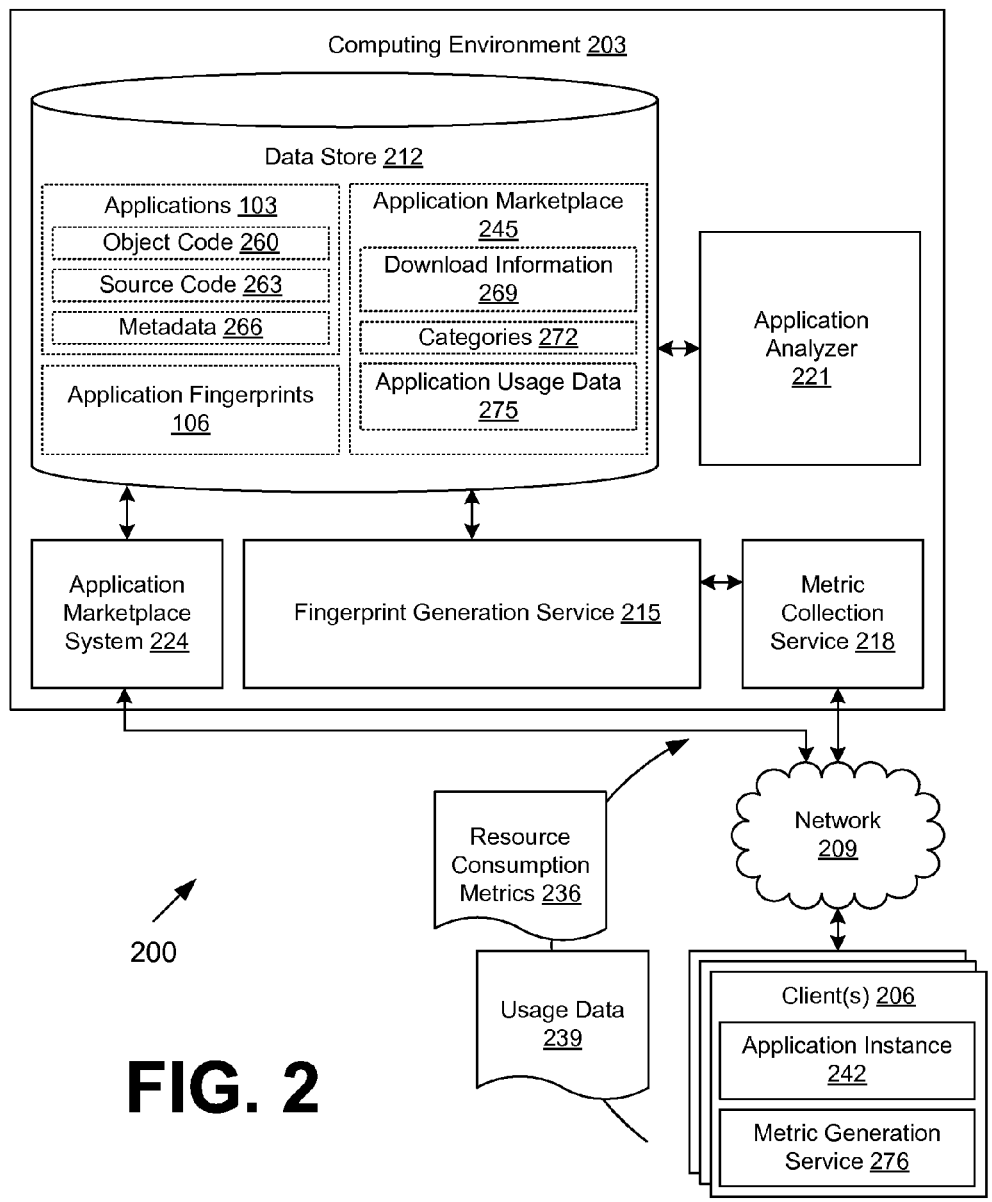
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a fingerprint generation service 215, a metric collection service 218, an application analyzer 221, an application marketplace system 224, and other applications, services, processes, systems, engines, or functionality not discussed in detail herein. The fingerprint generation service 215 is executed to generate application fingerprints 106 for applications 103.

Various techniques relating to application fingerprinting are described in U.S. Patent Application entitled "APPLICATION FINGERPRINTING" filed Jun. 25, 2013 under Ser. No. 13/926,607; U.S. Patent Application entitled "APPLICATION MONETIZATION BASED ON APPLICATION AND LIFESTYLE" filed Jun. 25, 2013 under Ser. No. 13/926,656; U.S. Patent Application entitled "DEVELOPING VERSIONS OF APPLICATIONS BASED ON APPLICATION FINGERPRINTING" filed Jun. 25, 2013 under Ser. No. 13/926,683; U.S. Patent Application entitled "APPLICATION RECOMMENDATIONS BASED ON APPLICATION AND LIFESTYLE FINGERPRINTING" filed Jun. 25, 2013 under Ser. No. 13/926,574; U.S. Patent Application entitled "RECOMMENDING IMPROVEMENTS TO AND CORRECTING DEFECTS WITHIN APPLICATIONS" filed Jun. 25, 2013 under Ser. No. 13/926,234; and U.S. Patent Application entitled "ANALYZING SECURITY OF APPLICATIONS" filed Jun. 25, 2013 under Ser. No. 13/926,211; all of which are incorporated herein by reference in their entirety.

The metric collection service 218 is executed to obtain various metrics as for use by the fingerprint generation service 215 in generating application fingerprints 106. Such metrics may include resource consumption metrics 236, usage data, and/or other types of metrics. Additionally, the metric collection service 218 can also obtain usage data 239 associated with a particular application 103 by users of the application marketplace 245 who have installed the application 103. Such usage data 239 can include crash data, or information related to the unexpected termination of an application 103. Usage data 239 can also comprise information about various aspects, features, levels of an application 103 that users of the application marketplace 245 utilize during usage of the application 103. For example, the usage data 239 can include usage time of a user within different levels of a game application, the amount of time a user spends in a particular section of an application relative to other applications, or an amount of network traffic originating from the application. Usage data 239 can also include an amount of usage time within a particular difficulty setting of an application, various maps or worlds of a game application, or any other usage metric associated with an application 103.

In one embodiment, an application 103 can be instrumented to report usage data 239 to the metric collection service 218. The usage data 239 and/or resource consumption metrics 236 can be stored in the data store 212 and associated with a user account of a user. In other embodiments, the metric collection service 218 is configured to store the usage data 239 and/or resource consumption metrics 236 on an aggregate, non-user identifiable basis. In either scenario, the stored data can be analyzed with respect to various attributes of users, such as demographic categories.

Various techniques relating to collecting behavioral usage metrics and/or usage data 239 from applications 103 are described in U.S. patent application Ser. No. 13/215,972 entitled "COLLECTING APPLICATION USAGE METRICS" and filed on Aug. 23, 2011, which is incorporated herein by reference in its entirety. Various techniques relating to profiling user behavior are described in U.S. patent application Ser. No. 13/555,724 entitled "BEHAVIOR BASED IDENTITY SYSTEM" and filed on Jul. 23, 2012, which is incorporated herein by reference in its entirety.

The application marketplace system 224 is executed to provide functionality relating to an application marketplace 245 in which a multitude of applications 103 may be submitted by developers and made available for purchase and/or download by users. The application marketplace system 224 may include functionality relating to electronic commerce, e.g., shopping cart, ordering, and payment systems. The application marketplace system 224 may support searching and categorization functionality so that users may easily locate applications 103 that are of interest. The application marketplace system 224 may include functionality relating to verification of compatibility of applications 103 with various clients 206.

The data stored in the data store 212 includes, for example, applications 103, application fingerprints 106, data relating to an application marketplace 245 and potentially other data. The applications 103 correspond to those applications 103 that have been submitted by developers and/or others, for example, for inclusion in the application marketplace 245. The applications 103 may correspond to game applications, email applications, social network applications, mapping applications, and/or any other type of application 103. In one embodiment, the applications 103 correspond to mobile applications 103 for use on mobile devices such as, for example, smartphones, tablets, electronic book readers, and/or other devices.

Each application 103 may include, for example, object code 260, source code 263, metadata 266, and/or other data. The object code 260 corresponds to code that is executable by clients 206, either natively by a processor or by way of a virtual machine executed by the processor. The source code 263 corresponds to the source for the application 103 as written in a programming language. In some cases, the source code 263 may be generated by way of decompiling the object code 260. The source code 263 may be executable by clients 206 through the use of an interpreter. The metadata 266 may declare compatibility with various clients 206, software libraries or code fragments used by the application 103, device resources used by the application 103, and/or other information. In one embodiment, an application 103 is distributed as a "package" including the object code 260 and the metadata 266.

Application fingerprints 106 identify a respective application 103 by its characteristics. In one embodiment, an application fingerprint 106 corresponds to a summarized numerical value. In various embodiments, the application fingerprint 106 may be stored as a string. The application fingerprint 106 may include various unique identifiers for device resources, code fragments, graphical assets used by the application 103, files accessed by the application 103, and/or characteristics of the application 103. The application fingerprint 106 may indicate resource consumption profiles and/or behavioral usage profiles.

The data associated with the application marketplace 245 includes, for example, download information 269, categories 272, application usage data 275 and/or other data. The download information 269 indicates the popularity, either in terms of absolute number of downloads or in terms of relative popularity, of the applications 103 offered by the application marketplace 245. The download information 269 can also identify users, either individually by a user account and/or on an aggregate basis according to demographic category, that have downloaded a particular application 103. The categories 272 correspond to groupings of applications 103 that may indicate similar applications 103 and may be employed by users to more easily navigate the offerings of the application marketplace 245. Non-limiting examples of categories 272 may include social networking applications 103, mapping applications 103, movie information applications 103, shopping applications 103, music recognition applications 103, and so on.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display comprising, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as an application instance 242, a metric generation service 276, and/or other applications. The application instance 242 corresponds to an instance of an application 103 that has been downloaded to the client 206 from the application marketplace system 224. The application instance 242 may correspond to actual use by an end user or test use on a test client 206. The metric generation service 276 is configured to monitor the application instance 242 and report data that the user of the client 206 has elected to share with the metric collection service 218. Such data may include resource consumption metrics 236, behavioral usage metrics, and/or other data. The client 206 may be configured to execute applications beyond the application instance 242 and the metric generation service 276 such as, for example, browsers, mobile applications, email applications, social networking applications, and/or other applications.

Next, a general description of the operation of the various components of the networked environment 200 is provided. To begin, an application 103 is received by the computing environment 203. The fingerprint generation service 215 then begins processing the application 103 to generate an application fingerprint 106. Such initial processing may comprise a static analysis, which may compare the object code 260 and/or the source code 263 against identified software libraries or recognizable code fragments in either an exact or substantially similar form. As an example, a code fragment may correspond to a software library. As another example, a code fragment may correspond to open-source reference code for performing some function. The fingerprint generation service 215 may also perform a dynamic analysis of the application 103, which may include executing an application instance 242 for the application 103 in a hosted environment and determining which code paths are taken by the object code 260.

The application fingerprint 106 may indicate which of the identified code fragments and/or identified hardware resources are actually used by the application instance 242. Resource consumption metrics 236 and/or usage data 239 may be generated by a metric generation service 276 executed in a client 206. The resource consumption metrics 236 and/or usage data 239 then may be reported back from the client 206 to the metric collection service 218 by way of the network 209, which can analyzed and incorporated into an application fingerprint 106 as well as application usage data 275. An application fingerprint 106 can also take into account resources used by an application 103, such as include sound files, graphical assets, graphical textures, images, buttons, user interface layouts, and so on. Such application resources may include data items on clients 206, e.g., contact lists, text messages, browsing history, etc. Identifiers for such application resources may be included in a generated application fingerprint 106. It is noted that the identified device resources may include static resources and runtime resources.

Accordingly, an application fingerprint 106 that has been generated may be used in many different ways. As one example, the application analyzer 221 analyze an application fingerprint 106 as well as application usage data 275 as well as the respective application fingerprints 106 and application usage data 275 of other applications 103 that are within a common category 272 in the application marketplace 245 to identify other applications 103 that are related. Applications 103 that are categorized together within categories 272 of an application marketplace 245 are sometimes not direct competitors or not closely related in functionality, target market, etc. Therefore, by analyzing the application fingerprints 106 as well as application usage data 275 of applications 103, embodiments of the disclosure can generate a refined set of application 103 that are related to a particular application 103.

Related applications 103 can be identified based upon a comparison of software libraries or recognizable code fragments as well as device resources employed by the application 103, information about users of the application, application usage data 275, and other data that is embodied within the respective application fingerprints 106 of the applications 103.

In one embodiment, the application analyzer 221 obtains a particular application 103 for the purposes of identifying applications within the category 272 associated with the application that are related to the application. The application analyzer 221 identifies other applications 103 that are within at least one category 272 as the application. The application analyzer 221 can identify other applications 103 within the category 272, based upon an analysis of their respective application fingerprints 106 that share a common software library or code fragment, use of a device capability, and/or aspect of a user population, in order to generate a more refined list of applications 103 that are related to the application 103. The application analyzer 221 can also identify applications 103 that are related to the application 103 and highlight the differences or distinctions between the applications 103 and the application 103. Various examples are provided herein.

As one example, the application analyzer 221 can identify those applications within the category 272 that employ the same and/or similar device capability. For example, applications within the same category 272 that also employ common hardware functionality such as location systems (e.g., Global Positioning System chipsets), network capabilities, display capabilities, accelerometer or other device orientation capabilities, or any other capability of a client 206 can be identified by the application analyzer 221.

As another example, the application analyzer 221 can identify those applications within the category 272 that employ a common software library or code fragment as the application 103. For example, applications that employ the same physics libraries, graphics libraries, network communications libraries, location libraries, social networking libraries, etc., can be identified based upon an analysis of the application fingerprint 106 of the applications 103 within the category 272. Applications 103 that employ the same or similar software libraries or code fragments are more likely to be related than applications 103 that do not employ a common software library or code fragment.

For example, referring back to the example depicted in FIG. 1, the application analyzer 221 can generate a refined list of applications 103 within a category 272 that are deemed related to the application 103a that includes application 103b but that does not include application 103c. The application analyzer 221 can make such a determination based upon an analysis of the application fingerprints 106a, 106b, and 106c associated with the applications 103a, 103b, and 103c. In the depicted example, the application 103a and 103b both employ a common software library or code fragment, which may be an indication that the applications 103a, 103b are related. Both applications 103a and 103b also employ a common device capability, which can also indicate relatedness. As another example, both applications 103a and 103b may result in a similar resource consumption profile with respect to one or more device resources, which can similarly indicate relatedness between the applications 103a and 103b.

In contrast, application 103c, for example, while categorized within the same category 272 as the application 103a, may not be placed in a refined list of related applications 103 with the application 103a if the application 103c employs fewer than a threshold number of common software libraries, code fragments and/or device capabilities. While the applications 103a and 103c are within the same category 272 within an application marketplace 245 in that they may both be related to "music," they may not be direct competitors or appeal to the same types of users. Accordingly, In this way, the application analyzer 221 can generate a refined list of applications 103 that are related to the application 103a based upon whether the applications 103 within a given category 272 of the application share common functionality and/or appeal to similar users, which, in some scenarios, is a better and more refined indicator of relatedness than categorization within an application marketplace 245.

The application analyzer 221 can also identify other applications 103 as members of a refined list of related applications 103 based on other information associated with the respective application signatures 106 and/or application usage data 275 of the applications 103. For example, the application analyzer 221 can identify a video frame rate, or an average frame rate at which content is rendered on a display of a client 206, that is associated with another application 103 and determine whether it is within a threshold percentage of an average frame rate of the application 103. The application analyzer 221 can also identify similarities and/or differences between the display resolution of the applications 103, whether the applications employ use social networking features, audio capabilities and/or codecs, video codecs, or any other feature or aspect of an application 103 that is embodied within an application fingerprint 106.

As another example, the application analyzer 221 can also calculate a binary similarity metric that determines the similarity between code fragments, object code and/or other binary representations of applications 103. A binary similarity metric can also indicate a degree of difference between binary representations of applications 103 based upon a bitwise comparison of the binary representations of the applications 103. If an application 103 from the category 272 is sufficiently similar to an application 103 under analysis according to such a binary similarity metric, then the application analyzer 221 can designate the application 103 as a member of a refined list of application 103 that are related to the application 103 that is being analyzed.

As another example, the application analyzer 221 can also identify other applications 103 from the category 272 that appeal to similar users as does the application 103. Accordingly, the application analyzer 221 can analyze application usage data 275 download information 269 and/or the application fingerprint 106 of another application 103 and determine whether a threshold percentage of users sharing one or more common attributes are users of both applications 103. Such an attribute can include a demographic category, such as age, location, income, etc., information about whether the users have downloaded similar applications in the past, or any other attribute with which users can be identified and/or categorized.

The application analyzer 221 can also identify other applications 103 that are a member of a refined list of applications 103 with respect to an application 103 based on when the application 103 is added to the application marketplace 245. For example, applications 103 that have been added and/or updated within the application marketplace 245 within a recent period of time (e.g., the past 6 months, the past one year, etc.) can be deemed as relevant and/or related to an application 103. As another example, applications 103 that were added to the application marketplace 245 within a threshold period of time of when an application 103 under analysis was added to the application marketplace 245 can also be deemed as relevant and/or related to the application 103.

Accordingly, the application analyzer 221 can generate reporting information that can be provided to a developer of a particular application 103 that includes information about other applications 103 that are within a refined list of application 103 that is generated by the application analyzer 221 with respect to the application 103. For example, a competitive landscape report can be generated that includes the refined list of applications 103 can indicate the performance of the refined list of applications 103 with respect to one another. Performance metrics may be related to download, usage, profitability, revenue, ratings, popularity, controversy, speed, utilization, difficulty, resource consumption, and the like. For example, the application analyzer 221 may determine that one application 103 is more popular within the application marketplace 245 than another application 103. As another example, the application analyzer 221 may determine that one application 103 garners more usage than another application 103 according to application usage data 275 collected by the metric collection service 218 for both applications. As yet another example, one application 103 may generate more revenue per user or total revenue (e.g., advertising revenue, application sales, etc.) than the application 103. Another example of a performance metric is usage time of an application 103. For example, if an application 103 is associated with a higher level of usage time by users, such a scenario can be deemed as more desirable than less usage time.

The application analyzer 221 can also employ the refined list of applications 103 to generate recommendations for users of an application marketplace 245. Additionally, the application analyzer 221 can rank the applications 103 within a refined list of applications 103 according to their relatedness to the application 103. For example, applications 103 within the category 272 that has more common aspects with the application 103 can be ranked higher than others. As another example, applications 103 within the category 272 that appeal to the most similar user population in terms of demographics can also be ranked higher than other application 103 within the category 272 appealing to less similar users. Additionally, the application analyzer 221 can also score the applications 103 within the refined list according to their similarity with respect to the application signature 106 and the user populations to which the application 103 appeals such that the score considers both factors.

Embodiments of the present disclosure can also analyze and generate recommendations regarding applications 103 with respect to the way in which content in an application 103 is separated into various aspects (e.g., levels, maps, worlds, difficulty settings, etc.). For example, game applications are often separated into various levels of difficulty or separated by plot elements of a story line. In other words, an application 103 is often "leveled" in that it is separated into different levels or sections. Accordingly, the application analyzer 221 can obtain application usage data 275 to determine whether modification with respect to the "leveling" of an application would be appropriate.

For example, the application analyzer 221 can determine whether usage of an application 103 as reflected in its application fingerprint 106 and/or application usage data 275 falls by a threshold percentage after a certain level within the application 103. If such a change in usage occurs, the application analyzer 221 can generate a recommendation for the developer that the leveling of the application should be examined and/or adjusted. As another example, the application analyzer 221 can determine whether usage of an application 103 by a particular segment of users (e.g., demographic category, similar download history, download preferences, etc.) changes by a threshold percentage after a certain level within an application 103. If such a change in usage occurs, the application analyzer 221 can generate a recommendation for the developer that the leveling of the application should be examined and/or adjusted. As another example, the application analyzer 221 can also determine whether usage of an application 103 by users is concentrated within certain levels or sections of an application 103. If such a change in usage occurs, the application analyzer 221 can generate a recommendation for the developer that the leveling of the application should be examined and/or adjusted.

The application analyzer 221 can determine whether usage of an application 103 as reflected in its application fingerprint 106 and/or application usage data 275 changes with respect to other aspects of the application 103 other than levels. For example, the application analyzer 221 can determine whether usage of an application 103 by a particular segment of users (e.g., demographic category, similar download history, download preferences, etc.) changes by a threshold percentage with respect to various difficulty settings, within various maps or worlds within a game application, or with respect to any other aspect of the application 103. If such a change in usage occurs, the application analyzer 221 can generate a recommendation for the developer that the particular aspect of the application associated with the change in usage should be examined and/or adjusted.

As another example, the application analyzer 221 can also determine whether usage of an application 103 by users is concentrated within certain difficulty settings of an application 103 or within certain maps or worlds of a game application based upon an analysis of the usage data 275. If such a change in usage occurs, the application analyzer 221 can generate a recommendation for the developer that the layout of the application with respect to maps or worlds should be examined and/or adjusted.

Figure 3:
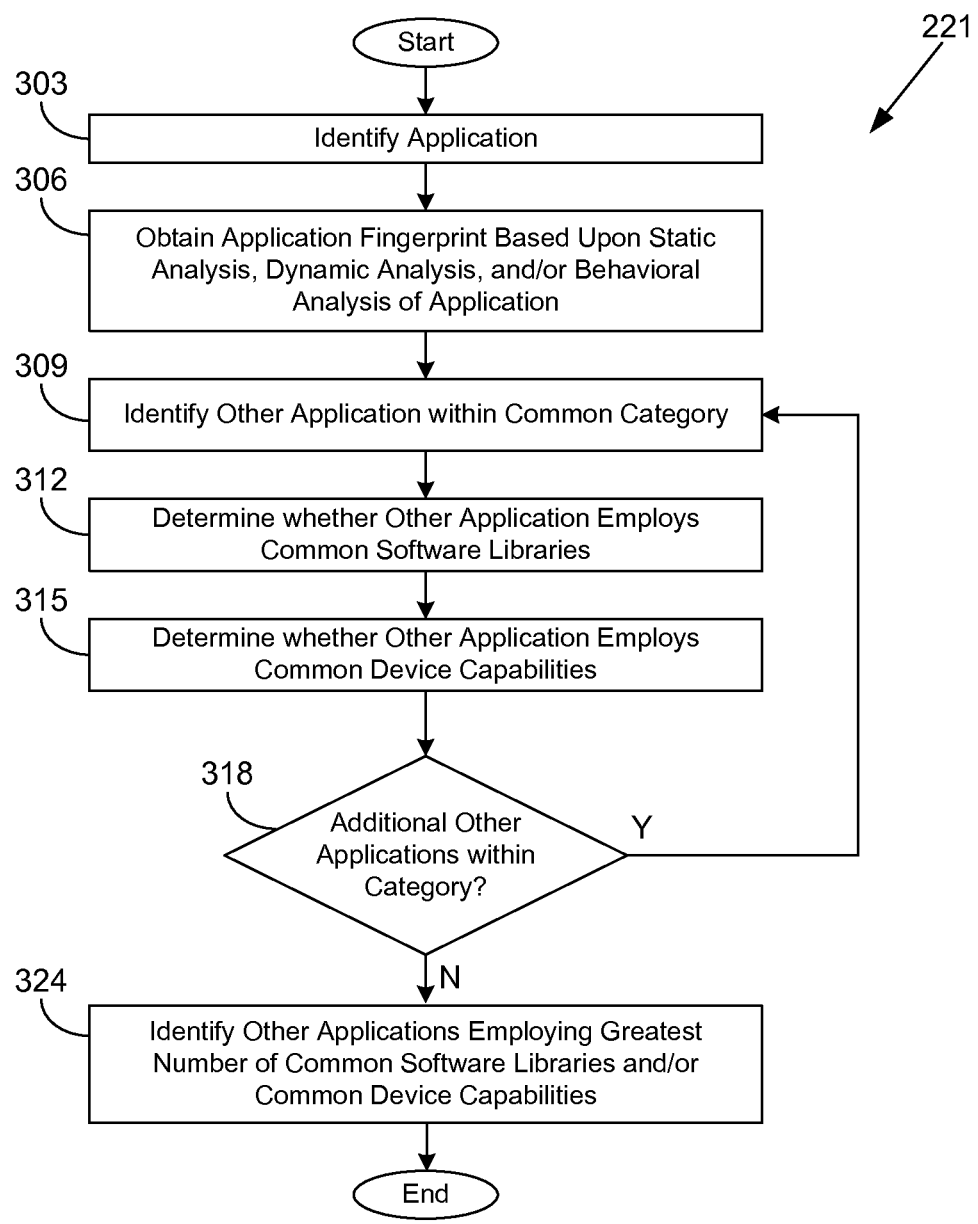
FIG. 3 is a flowchart illustrating one example of functionality implemented as portions of an application analyzer executed in a computing environment in the networked environment of FIG. 2 according to various embodiments of the present disclosure.

Referring next to FIG. 3, shown is a flowchart that provides one example of the operation of a portion of the application analyzer 221 according to various embodiments. It is understood that the flowchart of FIG. 3 provides merely an example of the many different types of functional arrangements that may be employed to implement the operation of the portion of the application analyzer 221 as described herein. As an alternative, the flowchart of FIG. 3 may be viewed as depicting an example of steps of a method implemented in the computing environment 203 (FIG. 2) according to one or more embodiments.

Beginning with box 303, the application analyzer 221 identifies an application 103 (FIG. 1). For example, a developer of an application 103 may wish to generate a competitive analysis of other applications within an application marketplace 245 that are similar in functionality to the application 103. As another example, the application marketplace 245 may employ the application analyzer 221 to generate recommendations for a user of the application marketplace 245. In box 306, the application analyzer 221 (FIG. 2) can obtain an application fingerprint 106 corresponding to the application 103. In box 309, the application analyzer 221 can identify another application that is within a common category 272 relative to the application 103.

In box 312, the application analyzer 221 can identify whether the other application 103 employs common software libraries or recognizable code fragments relative to the application 103. In box 315, the application analyzer 221 can identify whether the other application 103 employs common device capabilities relative to the application 103. In box 318, the application analyzer 221 determines whether there are additional applications 103 within the category 272 and progresses to similarly determine whether these applications 103 employ common software libraries, code fragments and/or device capabilities. At box 324, the application analyzer 221 identifies those applications 103 within the category 272 that employ the greatest number of common software libraries, code fragments and/or device capabilities and places those applications 103 into a refined list of applications 103 from the category. Thereafter, the process shown in FIG. 3 proceeds to completion.

Figure 4:
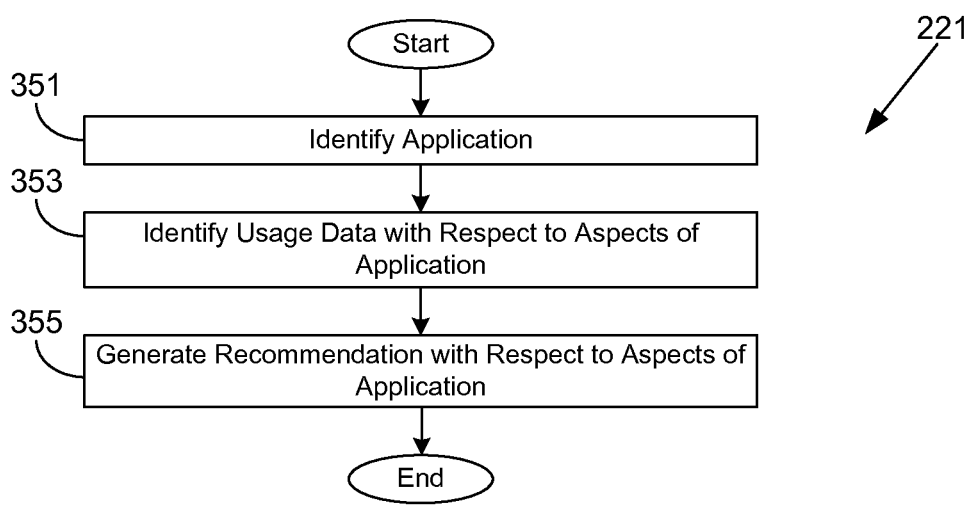
FIG. 4 is a flowchart illustrating one example of functionality implemented as portions of an application analyzer executed in a computing environment in the networked environment of FIG. 2 according to various embodiments of the present disclosure.

Referring next to FIG. 4, shown is a flowchart that provides one example of the operation of a portion of the application analyzer 221 according to various embodiments. It is understood that the flowchart of FIG. 4 provides merely an example of the many different types of functional arrangements that may be employed to implement the operation of the portion of the application analyzer 221 as described herein. As an alternative, the flowchart of FIG. 4 may be viewed as depicting an example of steps of a method implemented in the computing environment 203 (FIG. 2) according to one or more embodiments.

Beginning with box 351, the application analyzer 221 identifies an application 103 (FIG. 1). For example, a developer of an application 103 may which to obtain recommendation with respect to the adjusting of various aspects of an application 103. Next, in box 353, the application analyzer 221 identifies application usage data 275 with respect to the application 103 as described above. The application analyzer 221 can determine whether usage data changes by a threshold percentage within an application 103 with respect to a particular aspect of the application 103 based upon an analysis of the application usage data 275 and/or its application fingerprint 106. In box 355, the application 103 generates a recommendation with respect to the aspects of the application based upon the usage data 275 and/or the application fingerprint 106. Thereafter, the process ends.

Figure 5:
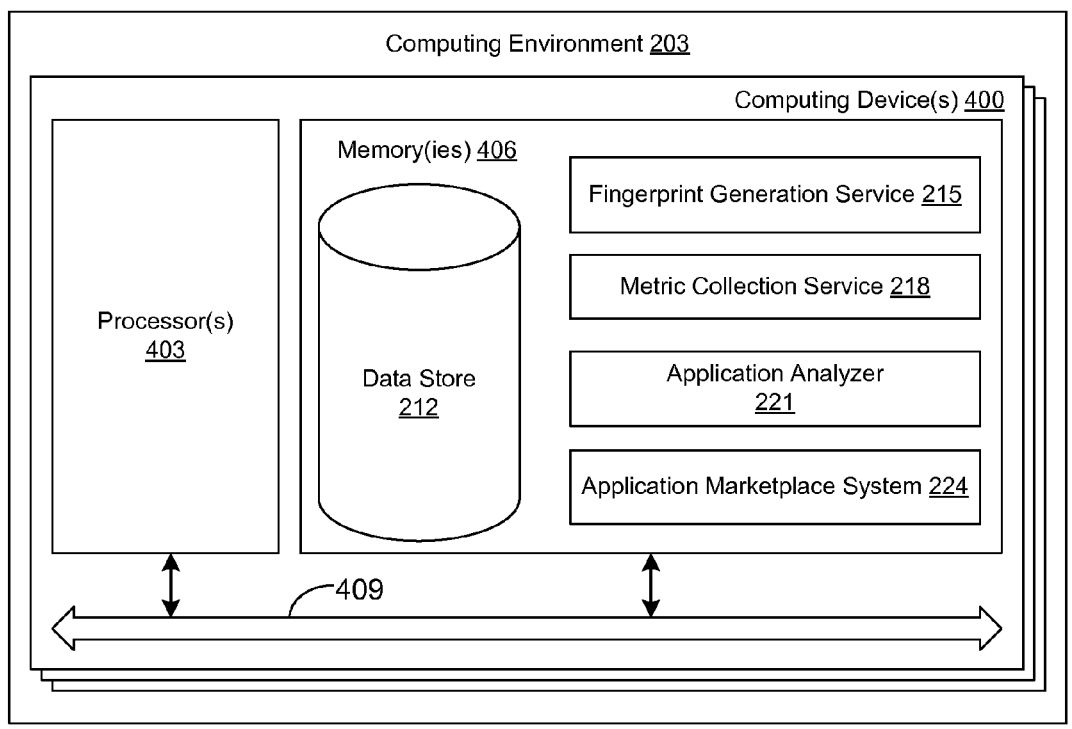
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 400. Each computing device 400 includes at least one processor circuit, for example, having a processor 403 and a memory 406, both of which are coupled to a local interface 409. To this end, each computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the fingerprint generation service 215, the metric collection service 218, the application analyzer 221, the application marketplace system 224, and potentially other applications. Also stored in the memory 406 may be a data store 212 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and/or multiple processor cores and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the fingerprint generation service 215, the metric collection service 218, the application analyzer 221, the application marketplace system 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3-4 show the functionality and operation of an implementation of portions of the application analyzer 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIG. 3-4 show a specific order of execution, it is understood that the order of execution may differ from that which is depicted. For example, the order of execution of two or more blocks may be scrambled relative to the order shown. Also, two or more blocks shown in succession in flowcharts of FIG. 3-4 may be executed concurrently or with partial concurrence. Further, in some embodiments, one or more of the blocks shown in flowcharts of FIG. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the fingerprint generation service 215, the metric collection service 218, the application analyzer 221, the application marketplace system 224, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having a computer-executable program stored thereon that, when executed by at least one computing device, configures the at least one computing device to perform operations comprising:
   identifying an application in an application marketplace;
   identifying a plurality of other applications within a category in which the application is associated;
   executing an instance of the application;
   performing, in response to executing the instance, an analysis of a set of code fragments employed by the instance and an analysis of a set of device resources employed by the instance;
   determining a resource consumption profile employed by the application based at least in part on the analysis of the set of code fragments and the analysis of the set of device resources;
   performing an analysis of usage data associated with the instance that is executed;
   generating an application fingerprint of the application based at least in part upon the analysis of the set of code fragments, the analysis of the set of device resources, and the analysis of the usage data, the application fingerprint comprising unique identifiers corresponding to the set of code fragments, the set of device resources, the resource consumption profile, and the usage data;
   identifying, based at least in part upon the application fingerprint and respective fingerprints of the plurality of other applications within the category, a subset of the plurality of applications within the category employing at least one of a threshold number of common code fragments or a threshold number of common device resources relative to the application; and
   identifying at least one difference between each of the subset of the plurality of applications and the application based at least in part upon the application fingerprint of the application.

2. The non-transitory computer-readable medium of claim 1, wherein the common device resource comprises use of at least one of: a device orientation detection capability, a location detection capability, a display capability, or an audio capability.

3. The non-transitory computer-readable medium of claim 1, wherein the operations further comprise identifying a performance metric associated with the application and the subset of the plurality of other applications.

4. The non-transitory computer-readable medium of claim 3, wherein the operations further comprise ranking the subset of the plurality of other applications according to a similarity to the application.

5. The non-transitory computer-readable medium of claim 1, wherein the usage data further comprises an amount of network traffic originating from the application.

6. The non-transitory computer-readable medium of claim 1, wherein the subset of the plurality of other applications is further identified based at least in part upon the respective fingerprints of the plurality of other applications indicating a respective frame rate associated with content rendered by each of the subset of the plurality of other applications that is within a threshold percentage of a frame rate associated with content rendered on a display device by the application.

7. A system, comprising:
   at least one computing device; and at least one service executable in the at least one computing device, the at least one service configured to cause the at least one computing device to:
  execute an instance of an application;
  perform, in response to executing the instance, an analysis of a set of code fragments employed by the instance and an analysis of a set of device resources employed by the instance;
  obtain an application fingerprint for the application, the application fingerprint based at least in part on the analysis of the set of code fragments employed by the instance, the analysis of the set of device resources employed by the instance, a resource consumption profile, and usage data associated with the instance;
  identify a plurality of other applications within a common category of the application in an application marketplace; and
  identify a refined set of applications from the common category, the refined set of applications being a subset of the plurality of other applications within the common category and being identified based at least in part upon an analysis of the application fingerprint and an analysis of a respective plurality of application fingerprints of the refined set of applications, wherein the refined set of applications employs at least one of a threshold number of common code fragments or a threshold number of common device resources relative to the application.

8. The system of claim 7, wherein the at least one service that causes the at least one computing device to identify the refined set of applications further causes the at least one computing device to rank the plurality of other applications according to a binary data similarity metric.

9. The system of claim 7, wherein the at least one service that causes the at least one computing device to identify the refined set of applications further causes the at least one computing device to identify at least one application from the plurality of other applications having a respective application fingerprint indicating a respective frame rate associated with content rendered by the at least one application that is within a threshold percentage of a frame rate associated with content rendered on a display device by the application.

10. The system of claim 7, wherein the at least one service that causes the at least one computing device to identify the refined set of applications further causes the at least one computing device to identify at least one application from the plurality of other applications having a respective application fingerprint indicating a threshold percentage of downloads of the at least one application being performed by a set of users sharing an attribute with another set of users who have downloaded the application as indicated by the application fingerprint.

11. The system of claim 7, wherein the at least one service that causes the at least one computing device to identify the refined set of applications further causes the at least one computing device to identify applications within the application marketplace having a respective application fingerprint indicating that the applications are added to the application marketplace within a predefined period of time.

12. The system of claim 7, wherein the at least one service further causes the at least one computing device to identify another refined set of applications from the common category, the another refined set of applications differing from the application based at least in part upon the analysis of the application fingerprint and a respective plurality of application fingerprints of the another refined set of applications.

13. The system of claim 12, wherein each of the other refined set of applications differs from the application by employing at least one code fragment that the application does not employ.

14. The system of claim 12, wherein each of the other refined set of applications differs from the application by employing at least one device resource that the application does not employ.

15. The system of claim 7, wherein the at least one service further causes the at least one computing device to rank the refined set of applications based at least in part upon a number common code fragments employed relative to the application.

16. The system of claim 7, wherein the at least one service further causes the at least one computing device to rank the refined set of applications based at least in part upon a number common device resources employed relative to the application.

17. A method, comprising:
  identifying, by at least one computing device, an application in an application marketplace;
  executing, by the at least one computing device, an instance of the application;
  obtaining, by the at least one computing device, an application fingerprint for the application, the application fingerprint based at least in part upon a static analysis of the application, a dynamic analysis of the instance, and a behavioral analysis of usage of the application by a plurality of users of the application marketplace;
  extracting, by the at least one computing device, usage data associated with the behavioral analysis of usage from the application fingerprint, the usage data associated with the plurality of users of the application marketplace;
  identifying, by the at least one computing device, usage of the application with respect to a plurality of aspects of the application from the usage data; and
  generating, by the at least one computing device, a recommendation with respect to modifying the plurality of aspects based at least in part upon the usage of the application with respect to the plurality of aspects by identifying an aspect among the plurality of aspects of the application at which usage of the application according to the usage data decreases by a threshold percentage.

18. The method of claim 17, wherein the plurality of aspects of the application comprise at least one of: a level within a game application, a map within the game application, a difficulty setting within the game application, a screen within the application, a feature provided by the application, or a portion of the application.

19. The method of claim 17, wherein generating the recommendation with respect to modifying the plurality of aspects comprises identifying an aspect of the application associated with a population of users for whom usage of the application according to the usage data decreases by the threshold percentage.

20. The method of claim 19, further comprising identifying the population of users, wherein the population of users comprises a subset of the plurality of users of the application marketplace, the subset being identified according to a demographic attribute.

21. The method of claim 17, wherein generating the recommendation with respect to modifying the plurality of aspects comprises generating reporting data identifying a number of users according to usage of the application associated with a plurality of aspects of the application.

22. The method of claim 17, wherein the aspect among the plurality of aspects corresponds to a particular level within the application and the recommendation comprises adjusting the particular level of the application.

* * * * *